US008155003B2

(12) United States Patent
Dong et al.

(10) Patent No.: US 8,155,003 B2
(45) Date of Patent: Apr. 10, 2012

(54) AGGREGATE POLICING APPLYING MAX-MIN FAIRNESS FOR EACH DATA SOURCE BASED ON PROBABILISTIC FILTERING

(75) Inventors: Xuanming Dong, Cupertino, CA (US);
Vijaya Kulkarni, Cupertino, CA (US);
Sameer Merchant, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 12/604,391

(22) Filed: Oct. 23, 2009

(65) Prior Publication Data

US 2011/0096674 A1 Apr. 28, 2011

(51) Int. Cl.
*H04L 12/26* (2006.01)

(52) U.S. Cl. ........................................... 370/232
(58) Field of Classification Search .................. None
See application file for complete search history.

(56) References Cited

U.S. PATENT DOCUMENTS

| | | | | |
|---|---|---|---|---|
| 7,020,143 | B2 * | 3/2006 | Zdan | 370/395.21 |
| 7,453,804 | B1 * | 11/2008 | Feroz et al. | 370/230 |
| 2005/0195740 | A1 | 9/2005 | Kwon | |
| 2005/0213504 | A1 | 9/2005 | Enomoto et al. | |
| 2005/0276219 | A1 | 12/2005 | Wang et al. | |
| 2006/0146708 | A1 * | 7/2006 | Kanazawa | 370/232 |
| 2007/0121505 | A1 * | 5/2007 | Ansari et al. | 370/230 |
| 2008/0025214 | A1 * | 1/2008 | Bettink et al. | 370/230 |
| 2009/0080328 | A1 * | 3/2009 | Hu et al. | 370/230 |
| 2011/0007631 | A1 * | 1/2011 | Raina et al. | 370/230 |

FOREIGN PATENT DOCUMENTS

WO   WO 2009/012811 A1    1/2009

OTHER PUBLICATIONS

Cisco Systems, Inc., "Cisco Nexus 7000 Series NX-OS Security Configuration Guide, Release 4.0", [online], Mar. 19, 2008 [retrieved on Aug. 7, 2009]. Retrieved from the Internet: <URL:http://www.cisco.com/en/US/docs/switches/datacenter/sw/4_0/nx-os/security/configuration/guide/sec_nx-os.pdf>, pp. 1-466.
Gowda et al., Copending U.S. Appl. No. 12/403,337, filed Mar. 12, 2009.

* cited by examiner

*Primary Examiner* — Min Jung
(74) *Attorney, Agent, or Firm* — Leon R. Turkevich

(57) ABSTRACT

In one embodiment, a method comprises calculating a corresponding data packet arrival rate for each of a plurality of data sources supplying data packets destined for a prescribed destination, the prescribed destination within a machine and the prescribed destination having a bandwidth capacity; calculating a guaranteed shared bandwidth rate for each data source based on assigning a corresponding selected portion of the bandwidth capacity relative to the corresponding data packet arrival rate; selectively passing each data packet from the corresponding data source as a passed data packet, or dropping the corresponding data packet, according to a calculated probability that the corresponding data packet arrival rate does not exceed the corresponding guaranteed shared bandwidth rate; and selectively filtering the supply of aggregated passed data packets, aggregated only from among the passed data packets supplied by the data sources, to the prescribed destination according to the bandwidth capacity of the prescribed destination.

20 Claims, 3 Drawing Sheets

AGGREGATE POLICING APPLYING MAX-MIN FAIRNESS FOR EACH DATA SOURCE BASED ON PROBABILISTIC FILTERING

TECHNICAL FIELD

The present disclosure generally relates to aggregate policing in network switching devices, for example Ethernet network switching devices. More particularly, the present disclosure relates to aggregate policing by a network switching device of data traffic from multiple data sources to a single destination within the network switching device.

BACKGROUND

A network device such as an Ethernet-based network switching device ("switch"), or an Internet Protocol (IP) over Ethernet-based network routing device ("router"), needs to be able to process data packets that are received simultaneously from multiple data sources (e.g., user computers, server devices, other switches or routers, etc.). The network device needs to be able to control the flow of data packets to ensure that the data packets received simultaneously from the data sources does not deplete the computing resources within the network device, for example creating a congestion condition.

The network device can control the flow of data packets from the multiple sources based on limiting the input bandwidth of an input port, for example a network switch port having a data link connected to a corresponding data source, to a fixed input bandwidth. Alternatively, the network device can implement aggregate policing for a destination circuit within the network device, where the aggregate bandwidth among all the data sources supplying data packets are limited by the capacity of the destination.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

Figure 1:
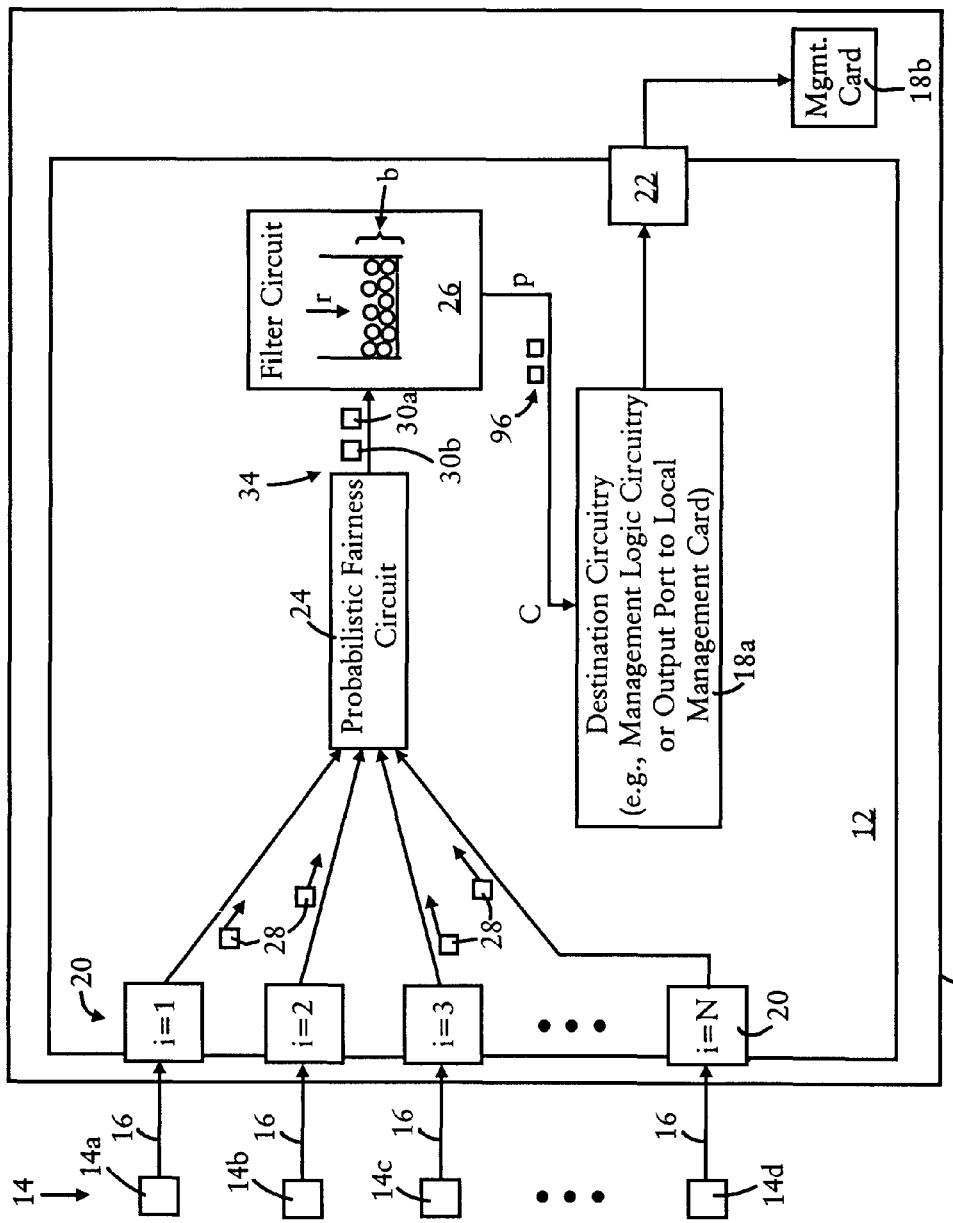
FIG. 1 illustrates an example network machine having an apparatus implementing max-min fairness for each data source based on applying probabilistic filtering, according to an example embodiment.

In one embodiment, a method comprises calculating a corresponding data packet arrival rate for each of a plurality of data sources supplying data packets destined for a prescribed destination, the prescribed destination within a machine and the prescribed destination having a bandwidth capacity; calculating a guaranteed shared bandwidth rate for each data source based on assigning a corresponding selected portion of the bandwidth capacity relative to the corresponding data packet arrival rate; selectively passing each data packet from the corresponding data source as a passed data packet, or dropping the corresponding data packet, according to a calculated probability that the corresponding data packet arrival rate does not exceed the corresponding guaranteed shared bandwidth rate; and selectively filtering the supply of aggregated passed data packets, aggregated only from among the passed data packets supplied by the data sources, to the prescribed destination according to the bandwidth capacity of the prescribed destination.

In another embodiment, an apparatus comprises a probabilistic fairness circuit and a filter circuit. The probabilistic fairness circuit is configured for calculating a corresponding data packet arrival rate for each of a plurality of data sources supplying data packets destined for a prescribed destination having a bandwidth capacity, the prescribed destination and the apparatus implemented within a machine. The probabilistic fairness circuit further is configured for calculating a guaranteed shared bandwidth rate for each data source based on assigning a corresponding selected portion of the bandwidth capacity relative to the corresponding data packet arrival rate. The probabilistic fairness circuit further is configured for selectively passing each data packet from the corresponding data source as a passed data packet, or dropping the corresponding data packet, according to a calculated probability that the corresponding data packet arrival rate does not exceed the corresponding guaranteed shared bandwidth rate. The filter circuit is configured for selectively filtering the supply of aggregated passed data packets, aggregated only from among the passed data packets supplied by the data sources, to the prescribed destination according to the bandwidth capacity of the prescribed destination.

DETAILED DESCRIPTION

Particular embodiments enable an apparatus, implemented within a machine, to apply a max-min fairness based on applying probabilistic filtering for each data source supplying data packets that are destined for a prescribed destination within the machine. The probabilistic filtering, calculated by the apparatus for each data source in response to the corresponding data packet having been received from that data source, is based on a calculated data packet arrival rate and a calculated guaranteed shared bandwidth rate for the corresponding data source. The apparatus selectively passes a data packet from a data source, or drops the data packet, according to a calculated probability that the corresponding data packet arrival rate does not exceed the corresponding guaranteed shared bandwidth rate. Hence, the passed data packets can be selectively filtered according to the bandwidth capacity of the prescribed destination.

Hence, the particular embodiments combine probabilistic filtering for each data source (calculated based on the bandwidth capacity of the prescribed destination) with selective filtering of the aggregated data packets that are passed among all the data sources. Hence, the particular embodiments provide a fair distribution of the data packets among all the sources relative to the bandwidth capacity of the prescribed destination. The particular embodiments thus avoid the problem of "starvation" that can occur by fixing an input port to a fixed input bandwidth, since the example embodiments enable a burst of data packets from one data source to be processed while another data source is relatively idle.

The particular embodiments also avoid the problem of proportional fairness among all data sources, where data packets from all data sources are equally controlled to a prescribed "leaking rate" and an aggressive data source can unfairly exploit the leaking rate of other compliant flows. For example, assume an aggregate policing provides a limit of 2 Megabits per second (Mb/s), a first data source provides data packets at an incoming rate of 1 Mb/s and a second data source provides data packets and incoming rate of 9 Mb/s such that execution of proportional fairness causes the first data source to have an incoming proportional rate of 0.2 Mb/s and the second data source to have an incoming proportional rate of 1.8 Mb/s: if the second data source improperly increases its traffic rate from 9 Mb/s to 15 Mb/s, the resulting proportional fairness reduces the incoming proportional rate of the first data source to 0.625 Mb/s while the second data source unfairly obtains an incoming proportional rate of 1.875 Mb/s. As described below, the probabilistic filtering of the example embodiments ensures that in this example both data sources obtain a guaranteed shared bandwidth rate of 1 Mb/s, relative to the bandwidth capacity of 2 Mb/s, such that one aggressive node cannot unfairly capture the guaranteed shared bandwidth rate from another data source.

FIG. 1 is a diagram illustrating an example network device (i.e., a network machine) 10 having an apparatus 12 for controlling the supply of data packets from data sources 14 (e.g., 14a, 14b, 14c, 14d) to a prescribed destination (e.g., 18a or 18b) within the network device 10, according to an example embodiment. The network device 10 is a physical machine (i.e., a hardware device) that can be configured for implementing network communications with other physical machines 14 (e.g., client computing devices, server computing devices, firewall computing devices, routers, switches, etc.) via data links 16 coupled to the apparatus 12. Hence, the network device 10 can be a network-enabled machine implementing network communications via the data links 16. An example of the network device 10 is the commercially available, Cisco Nexus 7000 series modular switching system that is modified as described herein.

The apparatus 12, implemented for example as a network line card 12 in a network switching device 10, or an application specific integrated circuit (ASIC) 12 in a computing device 10, is configured for applying a max-min fairness based on applying probabilistic filtering for each data source 14 supplying data packets that are destined for a prescribed destination 18a or 18b within the machine 10. Depending on implementation, the relevant destination can be implemented as destination circuitry (e.g., management logic circuitry) 18a implemented on the apparatus 12, for example if the apparatus 12 is implemented as an ASIC having an output lead 22 and multiple input leads 20 for receiving buffered data in the form of data packets; alternately, if the apparatus 12 is implemented as a network line card 12 having an output port 22 and multiple input switch ports 20, the relevant destination can be implemented as a supervisor line card 18b as implemented in the commercially available Cisco Nexus 7000 series modular switching system, where destination circuitry 18a can include circuitry for outputting the data onto the output port 22 for delivery to the management card 18b.

The apparatus 12 includes input data sources 20, implemented for example as input network switch ports or ASIC leads and serving as data sources for the apparatus 12. The apparatus 12 also includes a probabilistic fairness circuit 24, a filter circuit 26, and optionally destination circuitry 18a for data packets having been supplied by the data sources 20 and originally supplied by the external data sources 14.

Figure 2:
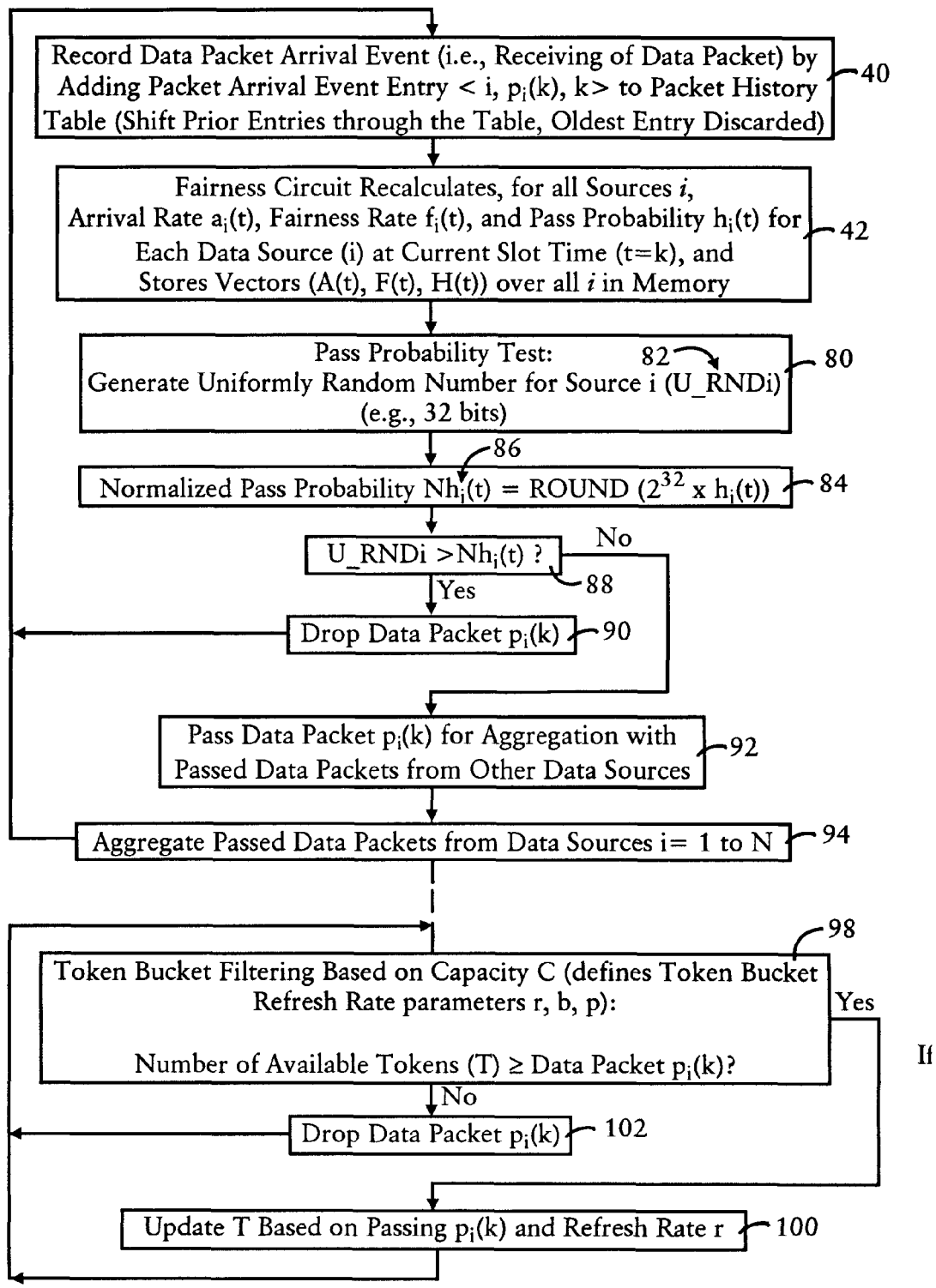
FIG. 2 illustrates a method by the example apparatus of FIG. 1 of implementing the max-min fairness based on applying probabilistic filtering, according to an example embodiment.
Figure 3:
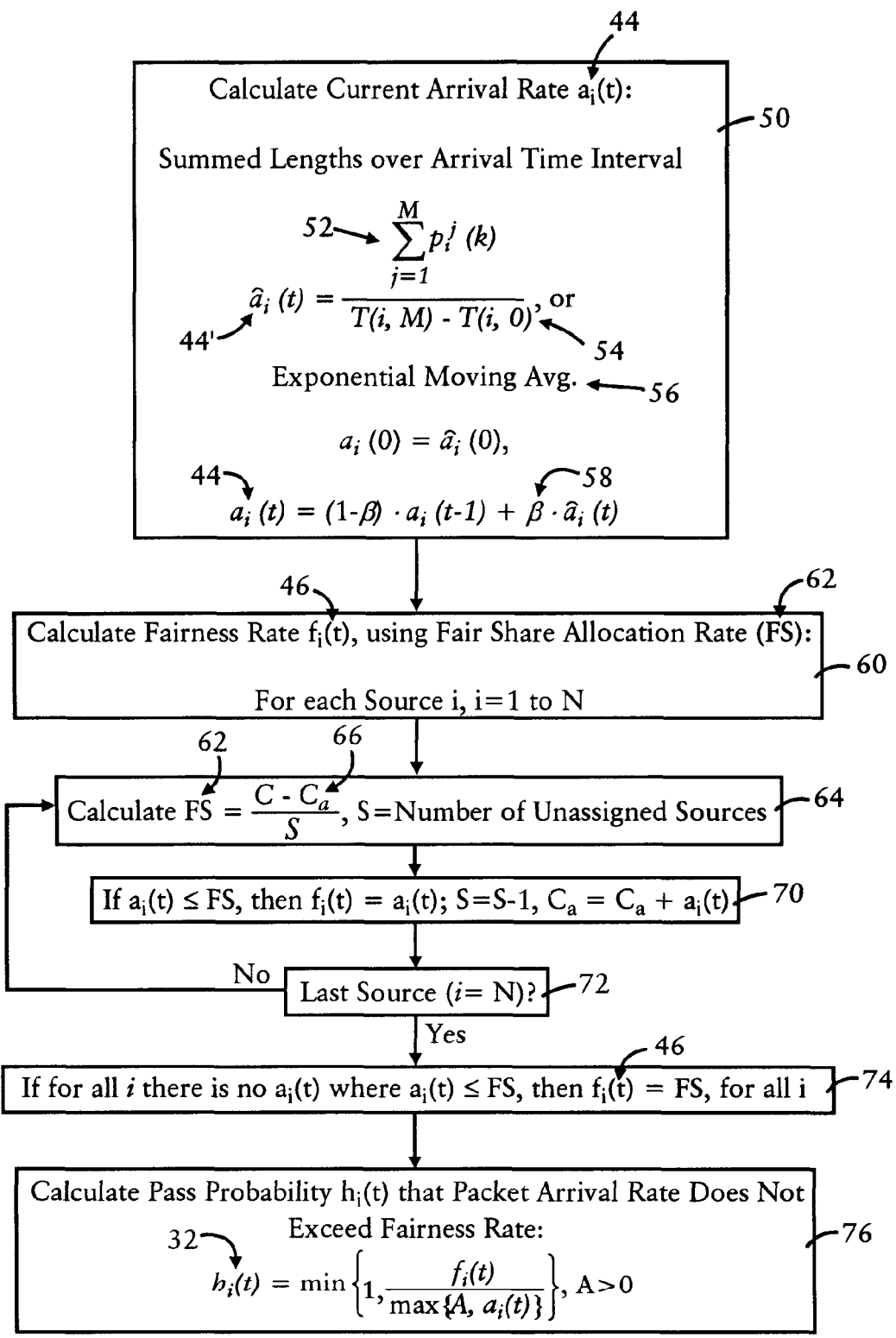
FIG. 3 illustrates example calculations for a data packet arrival rate, a guaranteed shared bandwidth rate, and a calculated probability that the data packet arrival rate for a corresponding data source does not exceed the corresponding guaranteed shared bandwidth rate, according to an example embodiment.

The probabilistic fairness circuit 24 is configured for receiving the data packets 28 from each of the data sources 20/14. The probabilistic fairness circuit 24, implemented for example as part of switching circuitry within a network switch, can be configured for identifying the arrival of a given data packet 28 from its corresponding data source 20, illustrated as the data source "i" having a value of "i=1 to N", where "N" is the total number of active data sources supplying data packets 28. The probabilistic fairness circuit 24 is configured for selectively passing each data packet 28 from a corresponding data source 20 as a passed data packet 30, or dropping the corresponding data packet 28, according to a calculated probability. As illustrated in FIGS. 2 and 3, the calculated probability is illustrated as the pass probability "$h_i(t)$" 32, where the value "t" corresponds to the timeslot that the data packet 28 supplied by the data source "i" 20 is received by the probabilistic fairness circuit. The passed data packet 30 (e.g., 30a) from the corresponding source (e.g., i=1) is aggregated with passed data packets (e.g., 30b) from only the other data sources 20 (e.g., i=3), resulting in a supply of aggregated passed data packets 34 that are supplied to the filter circuit 26. The probabilistic fairness circuit 24 is described in further detail below with respect to FIGS. 2 and 3.

The filter circuit 26 can be configured for selectively filtering the supply of aggregated passed data packets 34 into a filtered stream 96 output to the prescribed destination 18 according to the bandwidth capacity "C" of the prescribed destination. As described with respect to FIG. 2, the filter circuit 26 can be implemented using token bucket filtering, where the token bucket filtering is defined by the long-term average rate "r" that tokens are added (i.e., the token refresh rate), a burst size "b" destination 18 can process at any given time (e.g., token depth), and the maximum rate "p" at which data packets can be transmitted, also referred to as the peak transmission rate or the port speed.

Hence, the probabilistic fairness circuit 24 ensures the data packets 28 from the multiple sources 20/14 are passed fairly based on applying probabilistic filtering for each data source 20 supplying data packets that are destined for the prescribed destination 18, and the filter circuit 26 ensures that the supply of aggregated passed data packets 34 are selectively filtered according to the bandwidth capacity C of the prescribed destination 18a.

Any of the disclosed circuits 18, 24, 26 implemented in the network device 10 can be implemented in multiple forms. Example implementations of the disclosed circuits 18, 24, 26 include hardware logic that is implemented in a logic array such as a programmable logic array (PLA), a field programmable gate array (FPGA), or by mask programming of integrated circuits such as an application-specific integrated circuit (ASIC). The circuits 18, 24, 26 each can be implemented using a multi-processor system (e.g., having multiple central processing units (CPUs) operating in parallel within a single computer system), or a single CPU. Any of these circuits also can be implemented using a software-based executable resource that is executed by a corresponding internal processor circuit such as a microprocessor circuit (not shown), where execution of executable code stored in an internal memory circuit causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor circuit. Memory circuits can be implemented within any one of the circuits 18, 24, or 26, for example, using a non-volatile memory such as a programmable read only memory (PROM) or an EPROM, and/or a volatile memory such as a DRAM, etc.

Further, any reference to "outputting a data packet" (or the like) can be implemented based on creating the data packet in the form of a data structure and storing that data structure in a tangible memory medium in the disclosed apparatus (e.g., in a transmit buffer). Any reference to "outputting a data packet" (or the like) also can include electrically transmitting (e.g., via wired electric current or wireless electric field, as appropriate) the data packet stored in the tangible memory medium to another network node via a communications medium (e.g., a wired or wireless link, as appropriate) (optical transmission also can be used, as appropriate). Similarly, any reference to "receiving a data packet" (or the like) can be implemented based on the disclosed apparatus detecting the electrical (or optical) transmission of the data packet on the communications medium, and storing the detected transmission as a data structure in a tangible memory medium in the disclosed apparatus (e.g., in a receive buffer). Also note that the memory circuit 24 can be implemented dynamically by the processor circuit 22, for example based on memory address assignment and partitioning executed by the processor circuit 22.

FIG. 2 illustrates a method by the apparatus 12 of FIG. 1 of implementing the max-min fairness based on applying probabilistic filtering, according to an example embodiment. FIG. 3 illustrates example calculations for a data packet arrival rate, a guaranteed shared bandwidth rate, and a calculated probability by the probabilistic fairness circuit 24, according to an example embodiment. The steps described in FIGS. 2 and 3 can be implemented as executable code stored on a computer or machine readable storage medium (e.g., floppy disk, hard disk, ROM, EEPROM, nonvolatile RAM, CD-ROM, etc.) that are completed based on execution of the code by a processor circuit (e.g., a CPU or a multiprocessor system); the steps described herein also can be implemented as executable logic that is encoded in one or more tangible media for execution (e.g., programmable logic arrays or devices, field programmable gate arrays, programmable array logic, application specific integrated circuits, etc.).

Referring to FIG. 2, the probabilistic fairness circuit 24 is configured for recording in step 40 the arrival of a data packet 28 from a corresponding source 20 at a given event k, based on creating a packet arrival event entry within an internal table memory: the packet arrival event entry can specify values for the data source "i" having supplied the data packet 28, the arrival time "k" of the data packet, and the packet length "$p_i(k)$". The reference "$p_i(k)$" also will be used herein to identify the specific received packet 28 received from the corresponding data source "i" 20 at the corresponding timeslot "k". As illustrated in step 40, the probabilistic fairness circuit 24 can store the packet arrival event entry, indexed by data source "i" 20, using a shifting technique into a dual port memory, where the table memory can store the "M" most recent data packets from a given data source data source "i" 20, the most recent packet arrival event entry being added at a first end of the table memory, and the oldest packet arrival event entry being pushed out of the other end of the table memory. Hence, the parameter "k" for the received data packet "$p_i(k)$" also can correspond to packet sequence number "j", where $1 \leq j \leq M$. Hence, a new data packet 28 always has sequence number "M", and the packet sequence number "j" decreases by one for each existing packet entry as the new packet arrives.

The probabilistic fairness circuit 24 also can identify the source of each data packet using various means, for example based on a prescribed hardware interface, a prescribed source identifier added to the data packet 28 by a network switch port 20, etc. As such, the probabilistic fairness circuit 24 can be distinct from switching circuitry, if preferred.

As illustrated in FIGS. 2 and 3, the probabilistic fairness circuit 24 is configured for recalculating in step 42, for each of the sources "i", a corresponding data packet arrival rate "$a_i(t)$" 44, a guaranteed shared bandwidth rate "$f_i(t)$" 46, and a calculated probability 32 that the corresponding data packet arrival rate 44 does not exceed the corresponding guaranteed shared bandwidth rate 46. The calculated probability also is referred to as the pass probability rate "$h_i(t)$" 32.

Referring to FIG. 3, the probabilistic fairness circuit 24 is configured for calculating the data packet arrival rate "$a_i(t)$" 44 for each data source "i" 20 based on retrieving the "M" most recent packet arrival event entries from the corresponding data source "i" 20. As illustrated in step 50, the probabilistic fairness circuit 24 can calculate the data packet arrival rate 44 based on one of two alternative methods.

In one method, the probabilistic fairness circuit 24 can calculate the data packet arrival rate 44 based on calculating a ratio "$\hat{a}_i(t)$" 44' of a summation 52 of lengths "$p_i^j(k)$" of the "M" most recent data packets 28 from the corresponding data source "i", relative to an arrival time interval "$T(i, M)-T(i,0)$" 54. The value "$T(i, M)$" represents the arrival time of the most recent data packet from the corresponding data source "i", and the value "$T(i,0)$" represents the arrival time of the "M" oldest data packet from the corresponding data source "i". In this example, the data packet arrival rate 44 based on the ratio "$\hat{a}_i(t)$" 44' enables each of the last "M" received data packets 28 from the corresponding data source "i" to provide an equal contribution to the data packet arrival rate 44.

The probabilistic fairness circuit 24 also can calculate the data packet arrival rate 44 as an exponential moving average 56 of the ratio 44' calculated for another number (e.g., M=2) of the most recent data packets, illustrated in FIG. 3 as the two most recent data packets. In particular, assuming the estimation begins at time t=0, and assuming that the number of successive data packets analyzed is M=2, then the data packet arrival rate "$a_i(t)$" 44 is calculated relative to a history factor "$\beta$" 58, where $0<\beta<1$. Hence, a relatively large value for the history factor "$\beta$" 58 provides more weight on previous estimations and stabilizes the estimation by filtering out noises; a smaller history factor "$\beta$" 58 provides a greater response to recent estimation changes, providing more sensitivity in the calculated data packet arrival rate 44.

The probabilistic fairness circuit 24 also can be configured for recalculating the guaranteed shared bandwidth rate "$f_i(t)$" 46, also referred to as the fairness rate "$f_i(t)$" 46, for all sources in response to each received data packet 28. In particular, the probabilistic fairness circuit 24 can calculate the guaranteed shared bandwidth rate "$f_i(t)$" 46 in step 60, using a fair share allocation rate "FS" 62 for unassigned sources "i": "C" is the total bandwidth capacity of the prescribed destination 18, and "$C_a$" is the allocated bandwidth that has already been allocated to other data sources "i". Hence, the probabilistic fairness circuit 24 can calculate the guaranteed shared bandwidth 62 based on calculating in step 64 the available portion "$C-C_a$" 66 of the bandwidth capacity "C", relative to the number "S" of data sources that still require assignment of the corresponding guaranteed shared bandwidth rate 46.

After calculating in step 64 the fair share allocation rate "FS" 62 of the available portion 66 of the bandwidth capacity relative to the number "S" of unassigned sources "i" 20, the probabilistic fairness circuit 24 can determine in step 70 if the data packet arrival rate "$a_i(t)$" 44 for the current source under analysis is less than the fair share allocation rate (FS) 62: if the data packet arrival rate "$a_i(t)$" 44 is less than or equal to the fair share allocation rate "FS" 62, then the guaranteed shared bandwidth rate "$f_i(t)$" 46 for the corresponding source "i" is set to equal the corresponding data packet arrival rate "$a_i(t)$" 44, and the number of unassigned sources "S" is decremented and the available portion "$C-C_a$" 66 updated with the data packet arrival rate "$a_i(t)$" 44 of the newly allocated source.

The probabilistic fairness circuit 24 repeats the process in step 72 for all sources "i". Note, however, that if in steps 70 and 72 there is no source "i" having a corresponding data packet arrival rate "$a_i(t)$" 44 that is less than or equal to the fair share allocation rate "FS" 62, then the probabilistic fairness circuit 24 can set in step 74 the guaranteed shared bandwidth rate "$f_i(t)$" 46 for all of the data sources to equal the fair share allocation rate "FS" 62.

The probabilistic fairness circuit 24 also can calculate in step 76 the pass probability rate "$h_i(t)$" 32 for each corresponding data source "i" 20. As illustrated in FIG. 3, the calculated probability 32 is calculated as a minimum of either a value of 1, or the corresponding guaranteed shared bandwidth rate "$f_i(t)$" 46 divided by the corresponding data packet arrival rate "$a_i(t)$" 44. The expression "max $\{A, a_i(t)\}$" is to ensure division is not executed using a zero value.

Hence, the probabilistic fairness circuit 24 recalculates, for all sources "i", the corresponding data packet arrival rate "$a_i(t)$" 44, guaranteed shared bandwidth rate "$f_i(t)$" 46, and pass probability rate "$h_i(t)$" 32 in response to each data packet 28 that is received for the prescribed destination 18. Hence, the values for the data packet arrival rate "$a_i(t)$" 44, the guaranteed shared bandwidth rate "$f_i(t)$" 46, and the pass probability rate "$h_i(t)$" 32 for all of the data in step 42 of FIG. 2 sources "i" can be stored in the table memory as respective vectors A(t), F(t), H(t) for all data sources "i".

Referring to FIG. 2, the probabilistic fairness circuit 24, upon having updated its internal table memory with the data packet arrival rate vector A(t), the guaranteed shared bandwidth rate vector F(t), and the pass probability rate vector H(t), can execute for each received data packet a pass probability test based on generating in step 80 for each source "i" 20 a corresponding uniformly random number (U_RNDi) 82, for example a 32-bit number. The uniformly random number 82 is characterized in that it has an even probability distribution across its entire range such that each value within the range [0 to $2^{32}$] has the same probability of being chosen as the uniformly random number 82. The probabilistic fairness circuit 24 calculates in step 84 a normalized pass probability value "$Nh_i(t)$" 86 that converts the pass probability rate "$h_i(t)$" 32 from a value between 0 and 1 to a 32-bit value.

The probabilistic fairness circuit 24 executes the pass probability test in step 88 based on determining whether the uniformly random number (U_RNDi) 82 for the corresponding data packet exceeds the normalized pass probability value "$Nh_i(t)$" 86: if the probabilistic fairness circuit 24 determines in step 88 that the uniformly random number (U_RNDi) 82 for the corresponding data packet "$p_i(k)$" 28 exceeds the normalized pass probability value "$Nh_i(t)$" 86, the probabilistic fairness circuit 24 drops in step 90 the corresponding data packet "$p_i(k)$" 28 supplied by the corresponding source "i" 20. If, however, the probabilistic fairness circuit 24 determines in step 88 that the uniformly random number (U_RNDi) 82 for the corresponding data packet "$p_i(k)$" 28 does not exceed the normalized pass probability value "$Nh_i(t)$" 86, the probabilistic fairness circuit 28 passes in step 92 the corresponding data packet "$p_i(k)$" 28 as a passed data packet 30 (e.g., 30a of FIG. 1) for aggregation with the passed data packets 30 from other data sources "i" 20.

As apparent from the foregoing, the probabilistic fairness circuit 24 can be configured for selectively passing each data packet "$p_i(k)$" 28 from the corresponding data source "i" 20 as a passed data packet 30, or dropping the corresponding data packet "$p_i(k)$" 28, according to the calculated probability 32 that the corresponding data packet arrival rate "$a_i(t)$" 44 does not exceed the corresponding guaranteed shared bandwidth rate "$f_i(t)$" 46. Hence, the probabilistic fairness circuit 24 can continually adjust the guaranteed shared bandwidth rate "$f_i(t)$" 46 and the pass probability rate "$h_i(t)$" 32 based on changes in the data packet arrival rate "$a_i(t)$" 44 for each data source "i" 20; hence, more active data sources (e.g., 14b) can "borrow" bandwidth from other data sources (e.g., 14c) that are relatively quiescent, without unfairly "stealing" bandwidth from other data sources (e.g., 14d) that require the allocated bandwidth. Hence, the probabilistic filtering on a per packet basis permits accommodation of bursty traffic while guaranteeing fairness among the multiple data sources "i" 20 or 14.

The probabilistic fairness circuit 24 (and/or some other circuitry) can aggregate all of the passed data packets 30 in step 94 into a supply of aggregated passed data packets 34 to the filter circuit 26.

The filter circuit 26 can be configured for selectively filtering the supply of aggregated passed data packets 34, which are aggregated only from among the passed data packets 30 supplied by the data sources 20 and passed by the probabilistic fairness circuit 24, and outputting a filtered stream 96 of data packets to the prescribed destination 18 according to the bandwidth capacity C of the prescribed destination. As illustrated in FIG. 2, the filter circuit 26 can be configured for determining, for one of the aggregated passed data packets (e.g., 30a), whether a sufficient number of tokens (T) are available for the corresponding size "$p_i(k)$" of the corresponding data packet, where the number of tokens are based on a token refresh rate "r" relative to the bandwidth capacity C. The filter circuit 26 processes the aggregated passed data packet $p_i(k)$ 30a based on either passing in step 100 the one aggregated passed data packet to the output stream 96 if a sufficient number of tokens (T) are available. However, if in step 98 a sufficient number of tokens (T) are not available, the filter circuit 26 drops the data packet in step 102.

According to an example embodiments, max-min fairness can be implemented using a probabilistic approach for aggregate policing for a destination within a machine, implemented for example as a computing device. In the example embodiments, the average leaking rate R(t) will be approximately equal to the max-min fair rate F(t). Hence, max-min fairness can be implemented for aggregate policing in a line card, without the necessity of individual flow queue maintenance. Consider the following rationale. Suppose that W packets with length L come from source "i" during time interval $\Delta t$, and the max-min fair rate for source "i" is $f_i(t)$. Without loss of generality, for any packet z, assume that we generate a random number $d_i(z)$ from sample space {DROP=0, PASS=1} for the pass probability test result. Then $d_i(z)$ follows the standard binomial distribution with parameters W and $h_i(t)$. Based on the property of binomial distribution, the expectation of $d_i(z)$ is $E[d_i(z)]=h_i(t)$. Assume that the data packet arrival rate $a_i(t)$ and max-min fair rate $f_i(t)$ does not change significantly, or remains constant during time interval $\Delta t$. In case that $f_i(t) \leq a_i(t)$ is satisfied, the leaking rate $r_i(t)$ is:

$$r_i(t) = \frac{\sum_{z=1}^{w}(L*d_i(z))}{\Delta t},$$

while $$a_i(t) = \frac{\sum_{z=1}^{w}(L)}{\Delta t},$$

(it holds based on all assumptions in short time interval) and $h_i(t)=f_i(t)/a_i(t)$.

Thus the average leaking rate is:

$$E[r_i(t)] = E\left[\frac{\sum_{z=1}^{w}(L*d_i(z))}{\Delta t}\right]$$

$$= \frac{\sum_{z=1}^{w}(L*E[d_i(z)])}{\Delta t}$$

$$= \frac{\sum_{z=1}^{w}(L*h_i(t))}{\Delta t}$$

$$= \frac{\sum_{z=1}^{w}(L)}{\Delta t} * h_i(t)$$

$$= \frac{\sum_{z=1}^{w}(L)}{\Delta t} * h_i(t)$$

$$= a_i(t) * f_i(t)/a_i(t)$$

$$= f_i(t)$$

Hence, the average leaking rate $r_i(t)$ for source "i" is equal to its max-min fair rate $f_i(t)$ in the short time interval $\Delta t$.

Although the example embodiments are illustrated with respect to implementing the apparatus 12 in a line card of a network switching device, the example embodiments also can be implemented in other computing devices that receive data from multiple data sources.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
   calculating a corresponding data packet arrival rate for each of a plurality of data sources supplying data packets destined for a prescribed destination, the prescribed destination within a machine and the prescribed destination having a bandwidth capacity;
   calculating a guaranteed shared bandwidth rate for each data source based on assigning a corresponding selected portion of the bandwidth capacity relative to the corresponding data packet arrival rate;
   selectively passing each data packet from the corresponding data source as a passed data packet, or dropping the corresponding data packet, according to a calculated probability that the corresponding data packet arrival rate does not exceed the corresponding guaranteed shared bandwidth rate; and
   selectively filtering the supply of aggregated passed data packets, aggregated only from among the passed data packets supplied by the data sources, to the prescribed destination according to the bandwidth capacity of the prescribed destination.

2. The method of claim 1, wherein the corresponding data packet arrival rate, guaranteed shared bandwidth rate, and calculated probability are recalculated for each data packet received for the prescribed destination.

3. The method of claim 1, wherein the calculating of the data packet arrival rate includes, for each corresponding data source:
   calculating the data packet arrival rate based on a ratio of a summation of lengths of a first number of most recent data packets from the corresponding data source, relative to an arrival time interval of the prescribed number of most recent data packets; or
   calculating the data packet arrival rate as an exponential moving average of the ratio calculated for a second number of the most recent data packets relative to a corresponding history factor applied to the ratio.

4. The method of claim 1, wherein the guaranteed shared bandwidth rate is calculated based on whether all of the data packet arrival rates exceed a fair share allocation rate of an available portion of the bandwidth capacity relative to a number of the data sources requiring assignment of the corresponding guaranteed shared bandwidth rate, or whether any of the data packet arrival rates are less than the fair share allocation rate.

5. The method of claim 1, wherein the selectively passing includes dropping the corresponding data packet based on:
   generating a uniformly random number for the corresponding data packet; and
   determining that the uniformly random number exceeds a normalized value of the calculated probability.

6. The method of claim 1, wherein the selectively passing includes passing the corresponding data packet based on:
   generating a uniformly random number for the corresponding data packet; and
   determining that the uniformly random number does not exceed a normalized value of the calculated probability.

7. The method of claim 1, wherein the calculated probability is calculated as a minimum of either a value of 1, or the corresponding guaranteed shared bandwidth rate divided by the corresponding data packet arrival rate.

8. The method of claim 1, wherein the selectively filtering includes:
   determining, for one of the aggregated passed data packets, whether a sufficient number of tokens are available relative to a corresponding size of the one aggregated passed data packet, the number of tokens based on a token refresh rate relative to the bandwidth capacity; and
   processing the one aggregated passed data packet based on one of passing the one aggregated passed data packet if the sufficient number of tokens are available, or dropping the one aggregated passed data packet if a sufficient number of tokens are not available.

9. The method of claim 1, wherein each of the calculating of the data packet arrival rates, the guaranteed shared bandwidth rates, and the calculated probabilities, and the selectively filtering are executed by an application-specific integrated circuit (ASIC).

10. An apparatus comprising:
    a probabilistic fairness circuit configured for:
    calculating a corresponding data packet arrival rate for each of a plurality of data sources supplying data packets destined for a prescribed destination having a bandwidth capacity, the prescribed destination and the apparatus implemented within a machine,
    calculating a guaranteed shared bandwidth rate for each data source based on assigning a corresponding selected portion of the bandwidth capacity relative to the corresponding data packet arrival rate, and
    selectively passing each data packet from the corresponding data source as a passed data packet, or dropping the corresponding data packet, according to a calculated probability that the corresponding data packet arrival rate does not exceed the corresponding guaranteed shared bandwidth rate;

the apparatus further comprising a filter circuit configured for selectively filtering the supply of aggregated passed data packets, aggregated only from among the passed data packets supplied by the data sources, to the prescribed destination according to the bandwidth capacity of the prescribed destination.

11. The apparatus of claim 10, wherein the probabilistic fairness circuit is configured for recalculating the corresponding data packet arrival rate, guaranteed shared bandwidth rate, and calculated probability each data packet received for the prescribed destination.

12. The apparatus of claim 10, wherein the probabilistic fairness circuit is configured for calculating the data packet arrival rate, for each corresponding data source, based on:
calculating a ratio of a summation of lengths of a first number of most recent data packets from the corresponding data source, relative to an arrival time interval of the prescribed number of most recent data packets; or
calculating an exponential moving average of the ratio calculated for a second number of the most recent data packets relative to a corresponding history factor applied to the ratio.

13. The apparatus of claim 10, wherein the probabilistic fairness circuit is configured for calculating the guaranteed shared bandwidth rate based on whether all of the data packet arrival rates exceed a fair share allocation rate of an available portion of the bandwidth capacity relative to a number of the data sources requiring assignment of the corresponding guaranteed shared bandwidth rate, or whether any of the data packet arrival rates are less than the fair share allocation rate.

14. The apparatus of claim 10, wherein the probabilistic fairness circuit is configured for dropping the corresponding data packet based on:
the probabilistic fairness circuit generating a uniformly random number for the corresponding data packet; and
the probabilistic fairness circuit determining that the uniformly random number exceeds a normalized value of the calculated probability.

15. The apparatus of claim 10, wherein the probabilistic fairness circuit is configured for passing the corresponding data packet based on:
the probabilistic fairness circuit generating a uniformly random number for the corresponding data packet; and
the probabilistic fairness circuit determining that the uniformly random number does not exceed a normalized value of the calculated probability.

16. The apparatus of claim 10, wherein the probabilistic fairness circuit is configured for calculating the calculated probability as a minimum of either a value of 1, or the corresponding guaranteed shared bandwidth rate divided by the corresponding data packet arrival rate.

17. The apparatus of claim 10, wherein the filter circuit is configured for:
determining, for one of the aggregated passed data packets, whether a sufficient number of tokens are available relative to a corresponding size of the one aggregated passed data packet, the number of tokens based on a token refresh rate relative to the bandwidth capacity; and
processing the one aggregated passed data packet based on one of passing the one aggregated passed data packet if the sufficient number of tokens are available, or dropping the one aggregated passed data packet if a sufficient number of tokens are not available.

18. The apparatus of claim 10, wherein the apparatus is implemented as an application-specific integrated circuit (ASIC).

19. An apparatus comprising:
means for selectively passing or dropping a data packet based on:
calculating a corresponding data packet arrival rate for each of a plurality of data sources supplying data packets destined for a prescribed destination having a bandwidth capacity, the prescribed destination and the apparatus implemented within a machine,
calculating a guaranteed shared bandwidth rate for each data source based on assigning a corresponding selected portion of the bandwidth capacity relative to the corresponding data packet arrival rate, and
selectively passing each data packet from the corresponding data source as a passed data packet, or dropping the corresponding data packet, according to a calculated probability that the corresponding data packet arrival rate does not exceed the corresponding guaranteed shared bandwidth rate;
the apparatus further comprising means for selectively filtering the supply of aggregated passed data packets, aggregated only from among the passed data packets supplied by the data sources, to the prescribed destination according to the bandwidth capacity of the prescribed destination.

20. Logic encoded in one or more tangible media for execution and when executed operable for:
calculating a corresponding data packet arrival rate for each of a plurality of data sources supplying data packets destined for a prescribed destination, the prescribed destination within a machine and the prescribed destination having a bandwidth capacity;
calculating a guaranteed shared bandwidth rate for each data source based on assigning a corresponding selected portion of the bandwidth capacity relative to the corresponding data packet arrival rate;
selectively passing each data packet from the corresponding data source as a passed data packet, or dropping the corresponding data packet, according to a calculated probability that the corresponding data packet arrival rate does not exceed the corresponding guaranteed shared bandwidth rate; and
selectively filtering the supply of aggregated passed data packets, aggregated only from among the passed data packets supplied by the data sources, to the prescribed destination according to the bandwidth capacity of the prescribed destination.

* * * * *